(12) United States Patent
Lee et al.

(10) Patent No.: US 6,228,426 B1
(45) Date of Patent: May 8, 2001

(54) PROCESS FOR PREPARING COMPOSITE INORGANIC MEMBRANES

(75) Inventors: Kew Ho Lee; Chang-Soo Jun, both of Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/343,187

(22) Filed: Jun. 30, 1999

(30) Foreign Application Priority Data

Oct. 19, 1998 (KR) .................................................. 98-44439

(51) Int. Cl.$^7$ .................................................. C23C 16/16
(52) U.S. Cl. .................. 427/250; 427/255.26; 427/255.6
(58) Field of Search .................................. 427/248.1, 250, 427/255.6, 255.26

(56) References Cited

U.S. PATENT DOCUMENTS 5,215,943 * 6/1993 Anderson et al. ...................... 501/12
5,468,819 * 11/1995 Goodall et al. ...................... 526/171

OTHER PUBLICATIONS

Chang–Soo Jun et al., "Preparation of palladium membranes from the reaction of Pd($C_3H_3$)($C_5H_5$) with $H_2$: wet–impregnated deposition," *Journal of Membrane Science*, vol. 157, pp. 107–115 (May, 1999).

* cited by examiner

Primary Examiner—Shrive Beck
Assistant Examiner—Bret Chen
(74) Attorney, Agent, or Firm—Finnegan, Henderson, Farabow, Garrett & Dunner, L.L.P.

(57) ABSTRACT

A process for manufacturing a composite inorganic membrane, comprising depositing one or a mixture of organometallic compounds according to formula (1):

$$M[allyl][cyclopentadienyl] \qquad (1)$$

in which: M is Pd, Nb, or Ni; on a surface of a porous supporter and then passing a reductive gas through the opposite side of said porous supporter to form a metal film at room temperature is discussed.

7 Claims, 2 Drawing Sheets

PROCESS FOR PREPARING COMPOSITE INORGANIC MEMBRANES

FIELD OF THE INVENTION

The present invention relates to a process for preparing a composite inorganic membrane and more particularly, to the process for preparing a composite inorganic membrane with excellent combination of properties such as permeation on specific gases and mechanical property, wherein an organometallic compound expressed by the following formula 1 is deposited on the surface of a porous supporter and then a reductive gas is passed through the opposite side of the supporter to form a metal film at room temperature; if deemed necessary, a mixture of the organometallic compound and organosilver compound expressed by the formula 2 is employed to prepare the composite inorganic membrane with the following merits: (1) the pores can be more compacted, (2) permeability for a specific gas during gas separation is excellent with better mechanical property, (3) the composite inorganic membrane can be more compacted due to the thermal treatment at a high temperature, (4) energy saving effects are visible due to the thermal treatment at a lower temperature than the conventional composite inorganic membrane, and (5) the membrane of the present invention is applicable as an excellent dehydrogenation catalyst on the organic compounds.

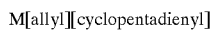
$$\text{M[allyl][cyclopentadienyl]} \tag{1}$$

Where, M represents Pd, Nb, or Ni.

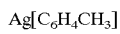
$$\text{Ag}[C_6H_4CH_3] \tag{2}$$

DESCRIPTION OF THE RELATED ART

A palladium composite inorganic membrane, which is currently commercialized, is prepared in such a manner that palladium or an alloy of palladium/silver (23%) is coated on the porous supporter in the thickness of more than 30 $\mu$m. However, the composite membrane has a poor permeability on hydrogen due to its large thickness of membrane, thus being efficiently inapplicable in any membrane reactor requiring a lot of fast reactions, except for the small scale purification of hydrogen. Under such circumstances, there is urgent need for developing a process for preparing more ultra-thin inorganic membranes.

To overcome such shortcomings, many researchers have recently focused on the formation of the composite membrane having the thickness of 1 $\mu$m via nucleation based on atomic or molecular units. Thus, various methods such as sputtering and chemical sputter-deposition method has been reported but these methods have yet to be commercialized, since more compact membrane cannot be obtained due to a plasticizing effect of a membrane formed at a very high temperature.

SUMMARY OF THE INVENTION

To solve above-mentioned problems, the objective of present invention is to supply a process for preparing composite inorganic membranes which have excellent mechanical property and permeability for a specific gas by depositing organometallic compounds, expressed by the formula 1, onto the surface of a porous supporter and streaming reductive gas on the opposite side in order to form metal film on the supporter surface, if necessary, have enhanced gas compactness by filling up fine pores in the membrane using said organometallic compounds with organosilver compounds expressed by the formula 2, especially can have high compactness and can be heat-treated at relatively low temperature after the heat-treatment of the supporter coated with said metal film at high temperature, and therefore can have energy saving effect and application to dehydrogenating catalysts for spot-lightened organic compounds.

DETAILED DESCRIPTION OF THE INVENTION

Figure 1:
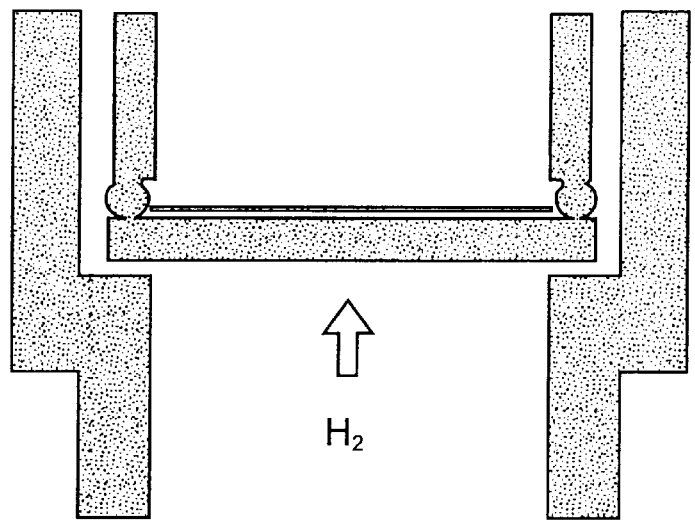
FIG. 1 is a schematic diagram showing the formation of metal film on the surface of porous supporter in such a manner that both M[allyl] [cyclopentadienyl] and Ag[$C_6H_4CH_3$] in crystal form are coated onto the surface of porous supporter, while hydrogen gas is flowed on its opposite side.

The present invention is characterized by a process for manufacturing a composite inorganic membrane, wherein an organometallic compound expressed by the following formula 1 is deposited on the surface of a porous supporter and then a reductive gas is passed through the opposite side of the supporter to form a metal film at room temperature.

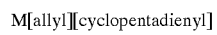
$$\text{M[allyl][cyclopentadienyl]} \tag{1}$$

Wherein, M represents Pd, Nb, or Ni.

The present invention is explained in more detail as set forth hereunder.

According to the present invention, the composite inorganic membrane can be prepared in such a manner that an organometallic compound expressed by the following formula 1 is deposited on the surface of a porous supporter and then a reductive gas is passed through the opposite side of the supporter to form a metal film. If deemed necessary, a mixture of the organometallic compound and organosilver compound expressed by the formula 2 is employed to prepare the composite inorganic membrane. The composite inorganic membrane of the present invention has excellent combinations of properties in that (1) the pores can be more compacted, (2) permeability for a specific gas during gas separation is excellent with better mechanical property, (3) the composite inorganic membrane can be more compacted due to the thermal treatment at a high temperature, (4) energy saving effects are visible due to the thermal treatment at a lower temperature than the conventional composite inorganic membrane, and (5) the membrane of the present invention is applicable as an excellent dehydrogenation catalyst on the organic compounds.

Generally, Pd[allyl][cyclopentadienyl] from the organometallic compound expressed by the formula 1, may be present in the forms of both solid crystal and solution in an appropriate solvent. Both forms are deposited as a fine palladium crystal. Therefore, an object of this invention is to provide the composite inorganic membrane of the present invention with better permselectivity on hydrogen gas in such a manner that the organometallic compound expressed by the formula 1 is deposited on the surface of a porous supporter in the crystal form or in a solution of Pd[allyl][cyclopentadienyl] having a high solubility to organic solvent such as pentane, hexane, benzene, etc.

The present invention is explained in more detail based on the manufacturing process as set forth below.

Cyclopentadiene group and allyl groups, which have a coordinated ligand with metal, are stable to palladium metal. Pd[allyl][cyclopentadienyl], so synthesized from the ligand, has a very high vapor pressure at room temperature and is stable under atmospheric circumstance in the form of crystal for a long period of time as an 18 electron compound. Since Pd[allyl][cyclopentadienyl] is stable under vacuum to about 200° C. due to its extremely high vapor pressure at room temperature, it can move continuously to the surface of supporter whose vapor deposition temperature is 250° C. without thermal decomposition. This advantage makes it easy to control the formation rate of membrane in the manufacture of palladium membrane. The process for preparing a membrane by filling up its pores is quite different from that for preparing a simple film of semiconductor. More specifically, if the initial feeding amount of organic metal material is too low in the manufacture of membrane on the surface of supporter, the formation of membrane is not be easily made available due to the deeply dispersed metals into pores. Therefore, during the initial formation of membrane, a large amount of organic metal material is fed to the surface of support to ensure that large pores are filled up with the condensated metal materials to some degree and with the decreasing vapor-deposition rate, more compacted palladium membrane is formed for the first time. The maximum feeding amount of organic metal material is determined by temperature and vacuum level, but enhancing the latter is better in order to move the metal safely. If hydrogen is used to decrease the vapor deposition temperature and increase the production yield, the vapor deposition temperature of Pd[allyl][cyclopentadienyl] can be lowered to room temperature.

Raw materials to produce a metal film of the present invention include organometallic compound expressed by the formula 1 in the form of crystal or solution dissolved in organic solvent. Hence, a single use of Pd[allyl][cyclopentadienyl] is preferred, while the mixture of Pd[allyl][cyclopentadienyl] and Ni[allyl][cyclopentadienyl] is employed in the weight ratio of 95:5~80:20, most preferably in the weight ratio of 80:20.

When the mixture is employed, careful attention should be exercised in that unlike Pd[allyl][cyclopentadienyl, Ni[allyl][cyclopentadienyl] is a liquid phase at room temperature and is easily oxidized with oxygen to NiII. Further, since Ni[allyl][cyclopentadienyl] is a highly volatile material, other solvents except for pentane cannot serve to maintain the precursor composition and to dry the supporter promptly.

An organometallic compound can be used in the form of crystal. The organometallic compound expressed by the formula 1 is coated onto the surface of porous supporter, as shown in FIG. 1. Also, the organometallic compound can be used in the form of solution. The examples of the organic solvent include pentane, hexane and benzene and it is most preferred to use pentane.

Figure 2:
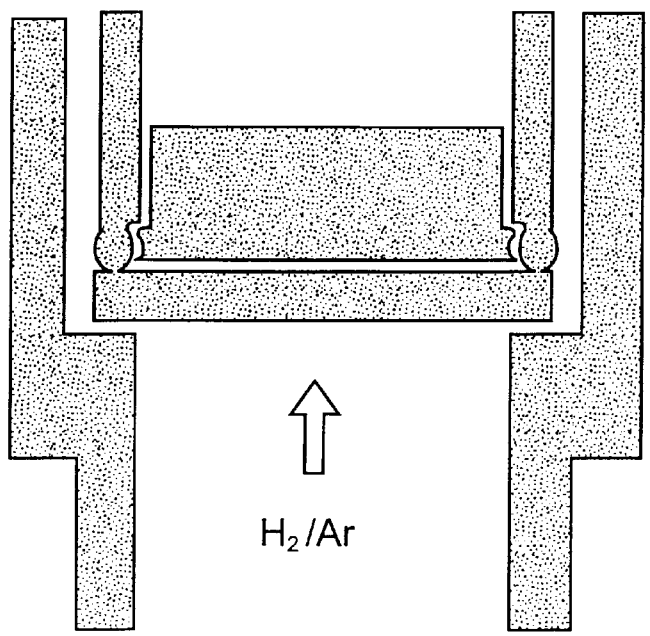
FIG. 2 is a schematic diagram showing the formation of metal film on the surface of porous supporter in such a manner that both M[allyl] [cyclopentadienyl] and Ag[$C_6H_4CH_3$] in solution form are coated onto the surface of porous supporter, while hydrogen gas is flowed on its opposite side.

As shown in FIG. 2, when the solution of organometallic compound dissolved in the organic solvent is laminated onto microporous stainless or alumina supporter having a pore size of less than 1 $\mu$m, red-colored fine molecular crystals of organometallic compound are extracted when the organic solvents are evaporated. More specifically, when the solution present on the surface of porous supporter is evaporated due to the capillary phenomenon of solution through fine pores, the solution immersed in the supporter comes up to the surface gradually and then fine molecular crystals of organometallic compound expressed by the formula 1 are laminated only on the surface. Then, the laminated molecular crystals are dried sufficiently.

After the molecular crystals are laminated on the surface of porous supporter, the surface is pressed down evenly by a teflon roller in order to form a thin layer of molecular crystals. Hence, it is preferred to control the amount of organometallic compound so that the layer of molecular crystals can have the thickness of 0.1~5 $\mu$m.

Then, when a reductive gas is slowly fed to the opposite side of supporter coated with the molecular crystals layer, the red crystals surface become gray or silver-gray metal film. Hence, a hydrogen gas can be used to increase the extraction rate by increasing the reaction rate, or a gaseous mixture of hydrogen and argon can be used to decrease the extraction rate by decreasing reaction rate, which is decreased by removing the desorbed organic molecules effectively or controlling the amount of hydrogen to be equivalently insufficient for organometallic compounds expressed by the formula 1. The amount of the reductive gas is fed to the surface of supporter until the red molecular crystals layer deposited on the surface of porous supporter is converted to a gray or silver-gray metal film.

Through the above procedure, a composite inorganic membrane having a metal film with the thickness of 0.1~5 $\mu$m can be prepared which can be used for a separation membrane for specific gas. By repeating two or three times the same procedure as described above, the gas compactness of the composite inorganic membrane is enhanced up to 100~200. If the metal film has a thickness of less than 0.1 $\mu$m, the separation capacity for specific gas is lowered but in case of exceeding 5 $\mu$m, the gas permeability is lowered, thus reducing the efficiency of the metal film.

The alloy membrane of palladium and silver can be prepared in the same manner as described above. Preferably, the alloy membrane is prepared in such a manner that a supporter is laminated with both of organometallic compound and organosilver compound dissolved in appropriate solvents and then a reductive gas is blown into the opposite side, followed by a thermal treatment to decompose the organic silver completely. More specifically, a supporter is laminated with the organometallic compound expressed by the formula 1 and the organosilver compound expressed by the formula 2, which are dissolved in pentane and tetrahydrofuran, respectively and then reacted with hydrogen at room temperature. Hence, it is preferred that both of organometallic compounds and organosilver compound are mixed in the weight ratio of 95:5~70:30.

When both of organometallic compounds and organosilver compound are reacted at room temperature, the organometallic compound is first decomposed by hydrogen and then the organosilver compound is decomposed by the heat generated from the preceding decomposition.

In consideration of the fact that the organosilver compound is easily decomposed at less than 100° C., the composite membrane is further heated at 100~130° C. for 30~60 minutes to decompose the organosilver compound completely. Then, the composite membrane comprising the crystals of palladium and silver with the size of less than $\mu$m is heated at 300~500° C. under the atmosphere of inactive gas (nitrogen) to the alloy membrane of palladium and silver.

The composite inorganic membrane, so prepared, have an excellent gas compactness and high permeation selectivity. The composite inorganic membrane itself can be used. However, since the membrane is formed mainly on the supporter surface, its mechanical property becomes poor in α→β phase transition. To improve its mechanical property, the composite membrane is additionally treated under heat. The thermal treatment is performed at a very high temperature of 300~800° C., most preferably at the temperature of 400~600° C. and under nitrogen pressure of 10 psi for 1~3 hours. If a reductive reaction under hydrogen pressure is concurrently performed during the thermal treatment, the composite membrane can have better gas compactness and mechanical property. After the thermal treatment, the gas compactness of composite membrane laminated with a metal film increased about three times as high as that of the composite membrane without any thermal treatment. The permeation selectivity for hydrogen/nitrogen was 60~100 at 450° C.

Figure 3:
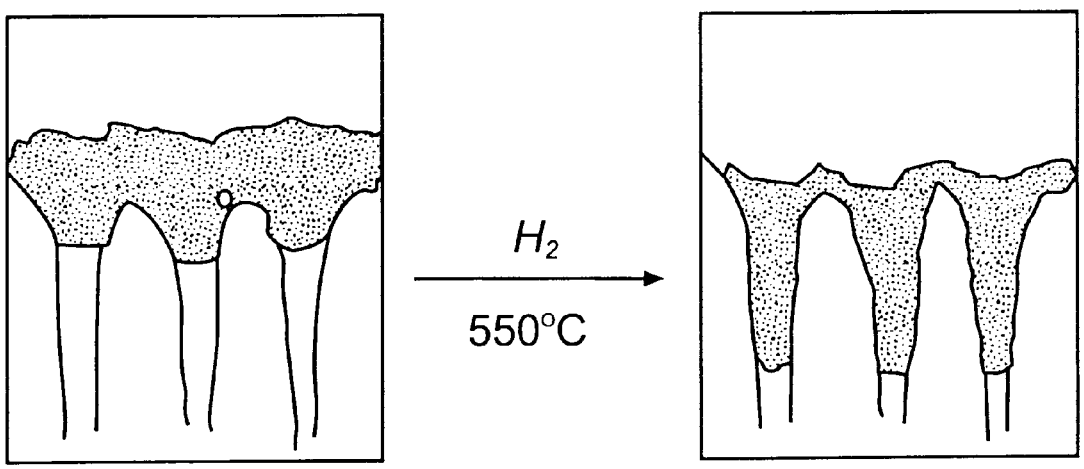
FIG. 3 is a schematic diagram showing that when a supporter having a metal film is thermally treated at a very high temperature and under hydrogen pressure, the metal film is stabilized and compacted in the pores of supporter.

To remove all impurities present in the composite membrane prepared under atmospheric pressure, the composite membrane of palladium/nickel/stainless is concurrently under hydrogen atmosphere during the thermal treatment and thus more compacted palladium film is formed due to the fact that the plasticizing temperature of palladium film is lowered by about 550° C. in the presence of hydrogen. From FIG. 3, it is noted that from the composite membrane, some empty spaces among nickel particles before the thermal treatment is compactly filled up at a high temperature of 550° C.

The composite membrane, which is formed on the surface of porous supporter laminated with a metal film having the thickness of 0.4~2 μm, has a hydrogen permeation amount of 1200 SCCM per minute through a circular valve (5 cm$^2$) at 550° C. This permeation amount represents a very high level, compared with a supporter (3000 SCCM) which is not laminated with a palladium film, thus nearly reaching the theoretical maximum level. Further, the permeation amounts at the temperature of 450° C. and 350° C. shows a decreasing trend of 1000 SCCM and 800 SCCM and this means that the permeation of hydrogen gas is diffused in a solution-dependent manner. Compared with the composite membrane before the thermal treatment, the gas compactness of the thermally treated composite membrane is increased about 20 times from 1×10$^2$ to 2×10$^3$. More specifically, better separation selectivity for hydrogen/nitrogen from 60 to 1200 can separate a highly pure hydrogen gas. Even though the composite membrane using a pure palladium cannot avoid some swelling caused by well known α→β phase transition of PdII cannot be avoided, the permeation selectivity of the stabilized membrane, being deposited into the pores of supporter, is decreased by 10% only at the temperature between 250° C. and 350° C. but the lowered selectivity of membrane can be recovered by the thermal treatment under hydrogen pressure for 2 hours.

The analytical results of a scanning electron microscopy (SEM) show that sponge-shaped palladium is filled up in the membrane to the depth of several μm from the surface of supporter, while the surface is laminated with more compacted metal film having the thickness of less than 1 μm including an active layer. Further, the analytical results of an energy dispersive X-ray (EDX) and an electron probe micro analysis (EPMA) show that the structure of metal film including an active layer is flexible at high temperature under hydrogen pressure.

More specifically, the active layer of palladium moves continuously to the internal supporter during the hydrogen permeation test; its initial thickness of the active layer of palladium increases but after a certain period of time, it reaches to equilibrium and decreases gradually. The life span of the composite membrane lasts until the active layer is worn down and disappears or until the active layer moves away from the layer of nickel particles and the structure of composite membrane is broken down. The membrane, which is tested at 550° C., maintains the constant permeation selectivity for about 2 days at the same temperature. However, the same membrane, which is tested at 450° C., is still stable even for more than one-week test. Therefore, it is preferred that the actual process for separating hydrogen is performed at a lower temperature of 250~350° C. Except for the active layer, the membrane must have active layers having the thickness of more than 2 μm so as to ensure its excellent permeation and mechanical property.

This invention is explained in more detail based on the following Examples but is not limited by these Examples.

Example 1

The microparticles of nickel were added to a porous stainless inorganic supporter (area: 5 cm$^2$, thickness: 1 mm) using a suction pump and treated thermally at 800° C. and under the pressure of 5×10$^{-5}$ mmHg for 5 hours. 5 mg of Pd[allyl][cyclopentadienyl] dissolved in pentane was absorbed on the porous nickel-stainless supporter. Pentane solution with a low permeation constant was dried nearly on the surface of supporter due to the capillary phenomenon to form red-colored molecular crystals layer. When argon gas was fed to the surface of supporter with a low angle, while the solution was dried, ultrafine crystals were formed and turned to orange color. After the molecular crystals layer was dried for about 5 minutes, the surface of the molecular crystals layer was pressed down by a teflon roller and laminated to the supporter. Then, hydrogen gas was slowly fed from the opposite side of supporter through pores for 2 minutes and reacted slowly with the molecular crystals layer. Through the reaction with hydrogen gas, red-colored Pd[allyl][cyclopentadienyl] was turned to silver or gray-silver to form a metal film of palladium. After one-time reaction was completed, the permeation amount of membrane was decreased from 1500 SCCM before coating to less than 200 SCCM under the nitrogen pressure of 51.9 mmHg. After the above procedure was repeated twice, the composite membrane with nitrogen permeation amount of less than 20 SCCM was obtained. The analytical results of EPMA showed that the palladium membrane having the thickness of 1~5 μm was formed depending on the amount of organometallic compound coated on the surface of nickel-stainless supporter. From the composite membrane, so formed, its permeability and selectivity of hydrogen/nitrogen were measured, as shown in table 1.

TABLE 1

| ΔP mmHg | N$_2$ (cc) | H$_2$ (cc) | H$_2$/N$_2$ selectivity | Remarks |
| --- | --- | --- | --- | --- |
| 10.3 | 0.32 | 64 | 400 | 450° C. |
| 20.7 | 0.66 | 130 | 400 | |
| 31.0 | 1.04 | 210 | 420 | |
| 41.3 | 1.40 | 300 | 430 | |
| 51.7 | 1.80 | 395 | 440 | |

Example 2

After Pd[allyl][cyclopentadienyl] was mixed with Ni[allyl][cyclopentadienyl] in the weight ratio of 8.2, the reaction mixture was dissolved in pentane in a dry box and deposited onto the surface of supporter surface in the same manner as Example 1. Then, the molecular crystals layer was dried under argon atmosphere and reacted with hydrogen in a hood to form a metal film. After the above procedure was repeated three times, the composite membrane with high gas permeability was prepared. From the composite membrane, so formed, its permeability and selectivity on hydrogen/nitrogen were measured in the same manner as in example 1, as shown in table 2.

TABLE 2

| ΔP mmHg | $N_2$ (cc) | $H_2$ (cc) | $H_2/N_2$ selectivity | Remarks |
|---|---|---|---|---|
| 10.3 | 0.10 | 24 | 480 | 450° C. |
| 20.7 | 0.20 | 50 | 500 | |
| 31.0 | 0.30 | 80 | 530 | |
| 41.3 | 0.40 | 110 | 550 | |
| 51.7 | 0.50 | 140 | 560 | |

Example 3

The composite membrane, so prepared From Example 1 was heated at 550° C. under nitrogen pressure for 2 hours in order to stabilize the surface of supporter. The permeation amounts on hydrogen and nitrogen were less than 800 SCCM and 10 SCCM, respectively at 450° C. and under the pressure of 10 psi; more specifically, the pores were decreased by about one third compared with preheat treatment. After the membrane was further under thermal treatment under the pressure of 50% hydrogen/nitrogen for 6 hours, the permeation amount for hydrogen was decreased by less than 0.7 cc. The analytical results of EPMA showed that the palladium layer was interpenetrated into the nickel-stainless supporter with the depth of about 2 $\mu$m, while the gas compactness of membrane was improved more than 10 times via thermal treatment under hydrogen pressure, compared with that of thermally untreated membrane. From the composite membrane, so formed, its permeability and selectivity on hydrogen/nitrogen were measured in the same manner as in example 1, as shown in table 3.

TABLE 3

| ΔP mmHg | $N_2$ (cc) | $H_2$ (cc) | $H_2/N_2$ selectivity | Remarks |
|---|---|---|---|---|
| 10.3 | 0.12 | 210 | 1750 | After passing |
| 20.7 | 0.26 | 472 | 1810 | hydrogen gas |
| 31.0 | 0.41 | 730 | 1780 | for 6 hours at |
| 41.3 | 0.56 | 998 | 1780 | 550° C. |
| 51.7 | 0.72 | 1270 | 1760 | |

Example 4

The composite membrane was prepared in the same manner as Example 1, except that as shown in FIG. 2, 50% gaseous mixture of hydrogen/argon was used instead of hydrogen gas under the pressure of 1 atm in the precursor solution; the gaseous mixture (200 cc) was blown into Schlenk flask, while the ambient pressure in a reactor was maintained through a syringe. After the membrane was dried, the permeation amount was in the range of 10~20 SCCM under nitrogen pressure of 51.7 mmHg. From the composite membrane, so treated thermally in the same manner as Example 3, its permeability and selectivity on hydrogen/nitrogen were measured, as shown in table 4.

TABLE 4

| ΔP mmHg | $N_2$ (cc) | $H_2$ (cc) | $H_2/N_2$ selectivity | Remarks |
|---|---|---|---|---|
| 10.3 | 0.20 | 150 | 750 | 450° C. |
| 20.7 | 0.40 | 310 | 775 | |
| 31.0 | 0.60 | 480 | 800 | |
| 41.3 | 0.80 | 630 | 790 | |
| 51.7 | 1.00 | 800 | 800 | |

Example 5

Pd[allyl][cyclopentadienyl] and Ag[$C_6H_4CH_3$] in low oxidizing state were mixed in the weight ratio of 70:30 in a manner to coordinate $PdCl_2$ and $AgNO_3$ to reductively-activated ligands, respectively. Each molecular crystal, so assayed, was dissolved in tetrahydrofuran, mixed well, and dried rapidly. The ultrafine crystals were deposited on the supporter.

Then, the surface of supporter laminated with the molecular crystals was levelled by a teflon roller and decomposed at the temperature of less than 84° C. and under hydrogen pressure to obtain the composite membrane via thermal treatment in the same manner as Example 3. Hence, the reaction started at the temperature of less than 62° C., a melting point of Pd[allyl][cyclopentadienyl]. However, since its reaction with hydrogen and hydrogen adsorption are exothermic, temperature was instantly increased up to 80° C., when excess of hydrogen was used.

The composite membrane was heated at 100° C. for 30 minutes and further heated at 450° C. under nitrogen pressure in a permeation device for 1 hours. Then, the alloy membrane of palladium/silver was prepared under hydrogen pressure in the same thermal treatment as Example 3. The permeability of $PdAg_{0.23}$ for hydrogen gas was $5.0 \times 10^{-2}$ $cm^3$ $cm^2$ mmH $g^{-1}$ ·$s^{-1}$ at 450° C. From the composite membrane, so formed, its permeability and selectivity on hydrogen/nitrogen were measured in the same manner as in example 1, as shown in table 5.

TABLE 5

| ΔP mmHg | $N_2$ (cc) | $H_2$ (cc) | $H_2/N_2$ selectivity | Remarks |
|---|---|---|---|---|
| 10.3 | 0.20 | 150 | 750 | 450° C. |
| 20.7 | 0.40 | 310 | 775 | |
| 31.0 | 0.60 | 480 | 800 | |
| 41.3 | 0.80 | 630 | 790 | |
| 51.7 | 1.00 | 800 | 800 | |

According to the present invention, it was revealed that the gas permeation amounts under the pressure difference of 10 psi was 1.2 cc at 350° C., 1.0 cc at 450° C. and 0.7 cc at 550° C., thus reflecting that the gas permeation amounts were decreased in parallel with the increase of temperature. Further, the permeation amount of hydrogen gas on membrane reached to the maximum level at 350° C. and under the pressure of 10 psi after 2 hours. The following permeation amounts of hydrogen was measured: 600 SCCM at 350° C., 800 SCCM at 450° C., and 1100 SCCM at 550° C.

The characteristic of palladium membrane is that the hydrogen permeation amount is increased in proportion to the increase of temperature. The gas permeability per minute was $5.16 \times 10^{-2}$ $cm^3$ $cm^{-2}$ mm $Hg^{-1}$ ·$s^{-1}$ on the average at 450° C.

From the composite inorganic membrane of the present invention, the plot for hydrogen permeation amount showed nearly almost linear slope for an imposed hydrogen pressure, not $P^{0.5}$. The hydrogen permeation amount of membrane for 50% gaseous mixture of nitrogen/hydrogen was measured as ½ level compared with that for pure hydrogen gas, thus reflecting that the hydrogen permeation amount was simply in proportion to the difference of partial pressure of hydrogen. Further, the hydrogen permeability for the alloy membrane of $PdNi_{0.2}$ showed about 40% over pure palladium membrane, while $PdAg_{0.23}$ had a similar hydrogen permeability.

As described above, the composite inorganic membrane of the present invention has several merits in that (1) excellent combination of properties such as permeation on specific gases and mechanical property, (2) the pores can be more compacted, (3) energy saving effects are visible due to the thermal treatment at a lower temperature that the conventional composite inorganic membrane, and (4) the membrane of the present invention is applicable as an excellent dehydrogenation catalyst on the organic compounds.

What is claimed is:

1. A process for manufacturing a composite inorganic membrane, comprising depositing one or a mixture of organometallic compounds according to formula (1):

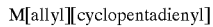    (1)

in which: M is Pd, Nb, or Ni; on a surface of a porous supporter and then passing a reductive gas through the opposite side of said porous supporter to form a metal film at room temperature.

2. The process for manufacturing a composite inorganic membrane according to claim 1, wherein said one or a mixture of organometallic compounds according to formula (1) is deposited on said surface of said supporter in the form of a crystal or a solution with organic solvents.

3. The process for manufacturing a composite inorganic membrane according to claim 1, wherein said reductive gas is a hydrogen gas or a gas mixture of hydrogen and argon.

4. The process for manufacturing a composite inorganic membrane according to claim 1, further comprising heating said porous supporter to a temperature ranging from 300 to 800° C. in the presence of hydrogen.

5. The process for manufacturing a composite inorganic membrane according to claim 1, further comprising dissolving said one or a mixture of organometallic compounds according to formula (1) with $Ag[C_6H_4CH_3]$ in a weight ratio ranging from 95:5 to 70:30.

6. The process for manufacturing a composite inorganic membrane according to claim 5, further comprising dissolving said mixture of organometallic compounds according to formula (1) and $Ag[C_6H_4CH_3]$ in an organic solvent, and then passing a reductive gas through the opposite side of said porous supporter when said composite inorganic membrane is at room temperature and further heated to a temperature ranging from 100 to 130° C. to form a metal film on the surface of said porous supporter, and then heating said composite inorganic membrane to a temperature ranging from 300 to 500° C. under an inactive gas atmosphere for metal alloying.

7. The process for manufacturing a composite inorganic membrane according to claim 6, further comprising heating said porous supporter to a temperature ranging from 300 to 800° C. in the presence of hydrogen.

* * * * *